United States Patent [19]
Spencer

[11] 3,948,401
[45] Apr. 6, 1976

[54] METHOD AND APPARATUS FOR STORING AND DISPLAYING FRUIT

[76] Inventor: Charles E. Spencer, 705 E. Main St., Fennville, Mich. 49408

[22] Filed: June 24, 1974

[21] Appl. No.: 482,460

[52] U.S. Cl. ................ 214/301; 214/152; 214/310; 206/522; 220/93; 221/279; 222/386; 222/405
[51] Int. Cl.² ......................................... B65G 65/04
[58] Field of Search .......... 214/301, 302, 310, 10.5, 214/152; 220/93; 222/386, 405, 386.5, 389; 221/278, 279; 206/522; 312/61, 71

[56] References Cited
UNITED STATES PATENTS

| | | | |
|---|---|---|---|
| 2,296,215 | 9/1942 | Layher | 220/93 |
| 3,031,092 | 4/1962 | Maskel | 214/310 |
| 3,407,974 | 10/1968 | Chmielowiec | 222/389 |

OTHER PUBLICATIONS
NASA-SP-5929(01) "Handling Operations" by M. J. McGoldrick, date–1971, p. 11.

*Primary Examiner*—Robert J. Spar
*Assistant Examiner*—Lawrence J. Oresky
*Attorney, Agent, or Firm*—Price, Heneveld, Huizenga & Cooper

[57] ABSTRACT

A method and apparatus for storing and displaying articles as fruit and the like utilizes a display package that includes a diaphragm member for holding the contents of the package and a pneumatic expander that moves the contents contained in the diaphragm member and the diaphragm member itself toward the top of the display package as the contents are removed or to the bottom of the package as contents are added.

11 Claims, 5 Drawing Figures

METHOD AND APPARATUS FOR STORING AND DISPLAYING FRUIT

BACKGROUND OF THE INVENTION

The present invention relates to display packages.

It is the practice in displaying certain goods, particularly perishable ones such as fruits or vegetables, to either display them in small packing boxes or to remove them altogether from packing boxes and place them on separate display tables.

This is practiced because large packing boxes have not been suitable for displaying fruit. In particular, as fruit is removed from the top of the box, the remaining fruit becomes less accessible. Also, fruit-buying customers for various reasons do not desire to purchase the last portion of fruit contained in a box.

Another related problem with conventional fruit packing boxes occurs when the boxes are filled. In filling such boxes, a conveyor typically spills fruit into the box and fruit initially packed into the bottom of the box because of the distance between the top and the bottom of the box has a high probability of being bruised.

SUMMARY OF THE INVENTION

In accordance with the present invention, a method and apparatus for storing and displaying articles as fruit and the like utilizes a display package with an expandable contents portion which provides a means for moving fruit or other goods either to the top of the package as the package is emptied or gently to the bottom of the package as it is filled.

The display package includes a diaphragm member that contacts the lower portion of the contents in the package and a pneumatic expander positioned below the diaphragm and abutting thereagainst that moves the diaphragm member and contents contained therein toward the top of the display package as the contents are removed or to the bottom of the package as the contents are added.

Preferably, the pneumatic expander is a flexible air bladder which is expanded by filling with air.

Also preferably, the diaphragm is a bag-like structure and is anchored along its upwardmost peripheral portion to the display package so that skewing of the diaphragm in the package does not occur.

In a sorting system embodiment, a pair of the display containers incorporating the pneumatic expander are positioned at the inlet and outlet ends of a conveyor. One of the pair of containers is adapted to deliver fruit to the conveyor while the other of the pair is adapted to receive the fruit.

DESCRIPTION OF THE PREFERRED EMBODIMENT

Figure 1:
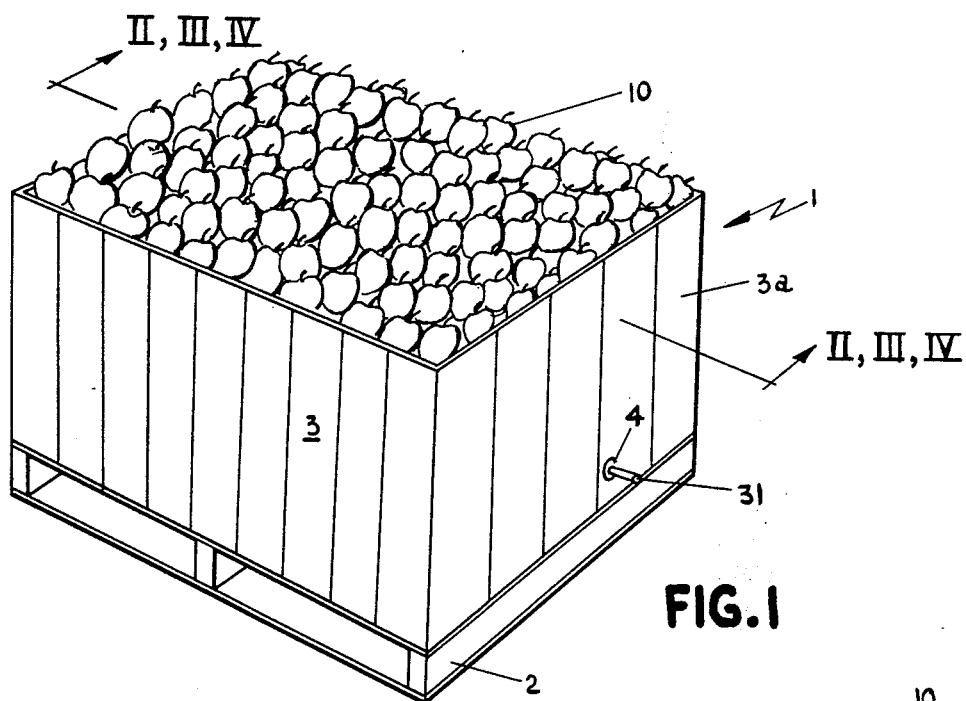
FIG. 1 is a perspective view of the display package of the present invention at all levels of fullness of contents.
Figure 2:
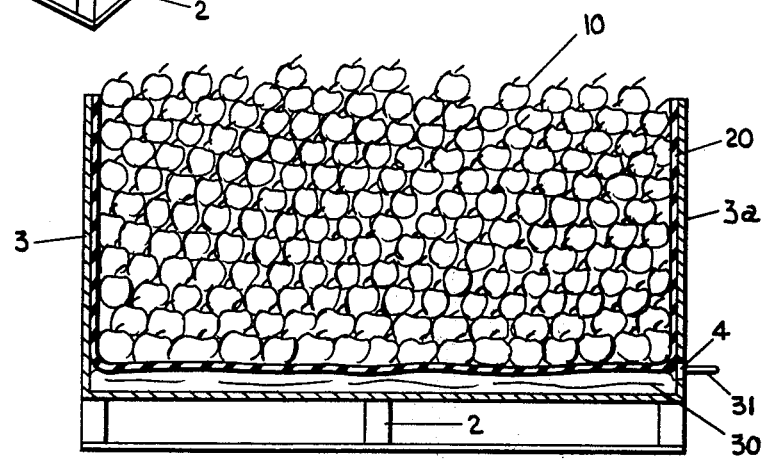
FIG. 2 is an elevational cross section view of a full display package along plane II—II of FIG. 1.

Referring to the drawings and in particular to FIGS. 1 and 2, packing crate 1 includes a diaphragm 20 positioned within crate 1 which surrounds and acts to contain fruit or other goods 10. Packing crate 1 further includes a pneumatic expander 30 positioned beneath diaphragm 20 that acts to displace diaphragm 20 and the fruit 10 contained therein either upward or downward as desired.

More specifically and referring to all the drawings, packing crate 1 includes a base 2 and sidewalls 3. As is apparent, crate 1 and its base 2 and sidewalls 3 are generally of conventional design and comprised of common materials such as wood or the like. Base 2 includes apertures therein to permit moving of crate 1 by means of a forklift or the like. Sidewalls 3 extend upward perpendicularly from base 2 and are rigidly attached thereto and rigid themselves. Sidewall 3a includes an aperture 4 along the lower portion thereof which communicates with the interior of packing crate 1.

Diaphragm 20 is a bag-like structure and is comprised of a flexible material of sufficient strength as to enable it to act as a container for fruit 10. In essence, diaphragm 20 is a flexible liner acting to separate fruit 10 from walls 3 of crate 1 and from base 2.

In the embodiment shown, diaphragm 20 is secured along its upwardmost peripheral portion to sidewalls 3 so that diaphragm 20 is secured from skewing or otherwise moving about in crate 1.

Pneumatic expander 30 is a hollow, collapsible bladder-like structure and its walled portion is comprised of material which is expandable.

Expander 30 includes a filler valve 31 that permits selective filling or emptying of the bladder portion as desired. Expander 30 may be filled with any pneumatic substance and, as shown, is filled with air.

Expander 30 is positioned within crate 1 underneath diaphragm 20. Filler valve 31 extends out of crate 1 through aperture 4 in sidewall 3a. Expander 30 is sufficiently expandable as shown in FIG. 4 so as to essentially fill crate 1.

Figure 3:
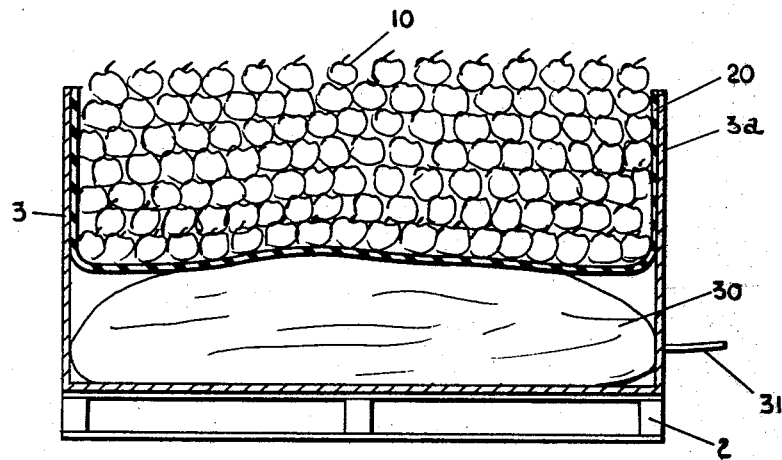
FIG. 3 is an elevational cross section view of a partially full display package along plane III—III of FIG. 1.
Figure 4:
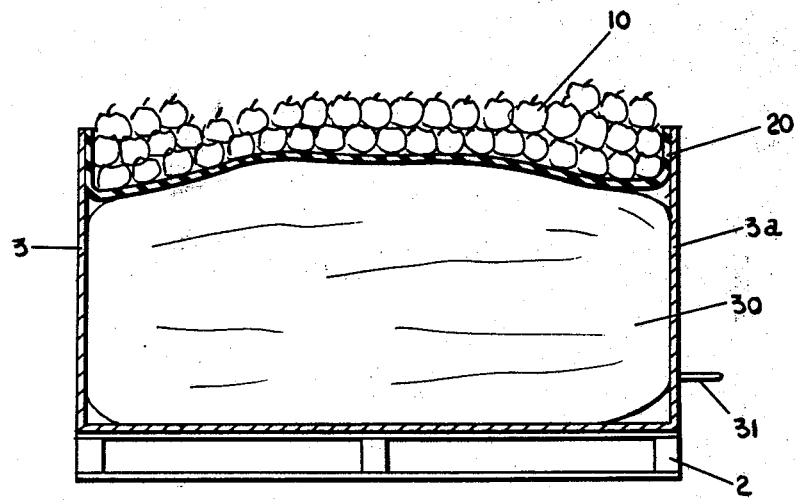
FIG. 4 is an elevational cross section view of a nearly empty display package along plane IV—IV of FIG. 1.

As is apparent from FIGS. 2–4, diaphragm 20 may be displaced within crate 1 by expander 30 either upward or downward sufficiently so as to maintain an essentially constant level of fruit 10 near the top of crate 1.

OPERATION

When it is desired to remove fruit 10 from crate 1, crate 1 is positioned on a retail sales floor and customers are allowed to remove fruit 10 from the top thereof. As fruit 10 is removed from the top, expander 30 is filled with air through valve 31 (as shown in the sequence of FIGS. 2, 3 and 4) and the level of fruit 10 is maintained to appear as seen in FIG. 1.

When it is desired to fill crate 1 from a conveyor or by other means, as fruit 10 is placed into diaphragm 20, expander 30 is gradually deflated until crate 1 is full of fruit as shown in the sequence of FIGS. 4, 3 and 2.

SYSTEM EMBODIMENT

Figure 5:
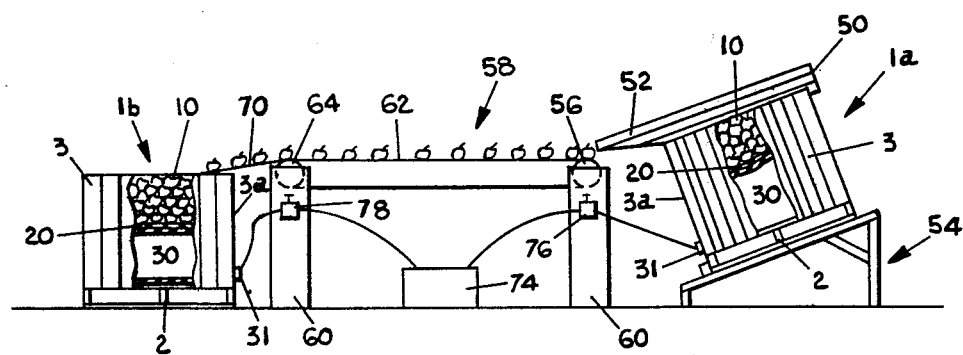
FIG. 5 illustrates a fruit sorting system utilizing the display container of the invention.

A sorting system incorporating the invention is illustrated in FIG. 5 wherein a conveyor 58 is disposed between a pair of the above described storing and display containers.

In the system embodiment, a first display container 1a is equipped with a three-sided frame-like enclosure 50 having a dumping chute 52 provided at its open end. Container 1a is angularly disposed on a support frame 54 adjacent the inlet and 56 of a conveyor assembly 58. Conveyor 58 is of conventional construction including a framework having legs 60 supporting an endless belt 62 for movement from input end 56 to an outlet end 64 in a conventional manner. A guide 70 at the outlet end 64 directs the fruit 10 or other articles into a second storing and display container 1b positioned adjacent the outlet end.

Suitable drive means (not shown) are provided to drive the endless belt 62 from the inlet 56 to the outlet 64. A source of air 74 is connected via suitable control valves 76 and 78 to the filler valves 31 associated with each container 1a and 1b, respectively. Valves 76 may be manually operated to inflate expander 30 in container 1a while valve 78 is operated to gradually deflate expander 30 in container 1b as fruit accumulates therein. Alternately, valves 76 and 78 may be pressure responsive valves. Valve 78, for example, exhausting the pressure in the expander associated with container 1b as the weight of accumulated fruit therein increases.

Valve 76 associated with container 1a may similarly be responsive to changes in pressure to maintain a sufficient pressure necessary to provide a constant output of fruit from container 1a along chute 52 to the input end 56 of sorting conveyor 58.

It will be understood that various changes in the details, materials, steps, and arrangements of parts which have been herein described and illustrated in order to explain the nature of the invention, may be made by those skilled in the art within the principle and the scope of the invention as expressed in the appended claims.

The embodiments of the invention in which an exclusive property or privilege is claimed are defined as follows:

1. An article storage, shipping and display apparatus comprising:
   an upwardly open container structure having a plurality of sidewalls and a base portion;
   a liner member positioned within said container structure between the sidewalls thereof and adapted to receive articles for display at the top of said container, said liner member comprising a flexible diaphragm, said diaphragm being resiliently deformable to receive articles and contain same within the confines of said sidewalls and said base; and
   an expander member positioned within said container structure between said diaphragm member and said base portion of said container structure, said expander member being adapted for connection to a source of fluid pressure and being expandable under the influence of fluid pressure to move said diaphragm member and the articles contained therein toward the top of the container as the articles are removed therefrom.

2. The article display apparatus of claim 1 and further including valve means on said expander member to allow filling therewith and removing therefrom a pneumatic substance.

3. The display package of claim 2 wherein said pneumatic substance is air.

4. The display package of claim 1 wherein said expander member is a hollow bladder-like structure with collapsible walls.

5. The display package of claim 1 wherein said diaphragm member is anchored along its upwardmost peripheral portion to the sidewalls of said display apparatus so that skewing of the diaphragm in the container does not occur as the diaphragm member is moved by said expander member.

6. The display package of claim 1 as particularly applied to containing and displaying fruit.

7. A method of storing and displaying articles in a retail outlet comprising: providing an upwardly open container structure having a plurality of sidewalls and a base portion; providing therein a liner member positioned within the container structure between the sidewalls thereof and adapted to receive articles for display at the top of the container, said liner member comprising a flexible diaphragm, said diaphragm being resiliently deformable to receive the articles and contain same within the confines of the sidewalls and the base; positioning an expander member within the container structure between said diaphragm member and said base portion of the container structure, said expander member being adapted for connection to a source of fluid pressure and being expandable under the influence of fluid pressure to move the diaphragm member and the articles contained therein toward the top of the container; and expanding said expander member as articles are removed from said container so that said diaphragm member and said articles are displaced toward the top of the container to replace the articles removed from the top of the container.

8. The method of claim 7 wherein said expander member is expanded by filling same with air.

9. In an article conveyor having inlet and outlet ends; means for depositing articles on said conveyor at said inlet end and means for receiving articles at said outlet end; the improvement in said depositing means comprising;
   an upwardly open container structure for holding articles to be deposited on the conveyor; said container having a plurality of sidewalls and a base portion;
   a liner member positioned within said container structure between the sidewalls thereof and adapted to receive articles for display at the top of said container, said liner member comprising a flexible diaphragm, said diaphragm being resiliently deformable to receive articles and contain same within the confines of said sidewalls and said base; and
   an expander member positioned within said container structure between said diaphragm member and said base portion of said container structure, said expander member being adapted for connection to a source of fluid pressure and being expandable under the influence of fluid pressure to move said diaphragm member and the articles contained therein toward the top of the container to urge the articles onto the conveyor.

10. The apparatus of claim 9 wherein said receiving means includes:
    a second upwardly open container structure including a plurality of sidewalls and a base portion;
    a second liner member positioned within said second container structure between the sidewalls thereof adapted to receive articles from the conveyor, said second liner member comprising a flexible diaphragm, said diaphragm being resiliently deformable to receive articles and contain same within the confines of said sidewalls and said base;

a second expander member positioned within said second container structure between said second diaphragm member and said base portion of said second container structure, said second expander member being capable of moving the diaphragm member and the articles contained therein toward the bottom of the container as articles are received therein.

11. The apparatus of claim 10 wherein said second expander member includes means thereon to allow filling therewith and removing therefrom a pneumatic substance.

* * * * *